(12) United States Patent
Kleiner et al.

(10) Patent No.: US 6,462,613 B1
(45) Date of Patent: Oct. 8, 2002

(54) POWER CONTROLLED INPUT RECEIVER

(75) Inventors: Michael B. Kleiner, Williston, VT (US); Kohji Hosokawa, South Burlington, VT (US)

(73) Assignees: Infineon Technologies AG, Munich (DE); International Business Machines Corporation, Armonk, NY (US)

( * ) Notice: Subject to any disclaimer, the term of this patent is extended or adjusted under 35 U.S.C. 154(b) by 150 days.

(21) Appl. No.: 09/597,121

(22) Filed: Jun. 20, 2000

(51) Int. Cl.$^7$ ................................................. G05F 3/02
(52) U.S. Cl. ..................... 327/544; 327/546; 327/89; 327/77
(58) Field of Search .................. 327/544, 77, 87, 327/88, 89, 54, 67, 546; 375/136, 319, 232, 150

(56) References Cited

U.S. PATENT DOCUMENTS

| | | | |
|---|---|---|---|
| 5,801,553 A | * 9/1998 | Danstrom | 327/67 |
| 5,920,208 A | * 7/1999 | Park | 327/54 |
| 5,939,937 A | 8/1999 | Terletzki | 327/541 |
| 6,043,694 A | 3/2000 | Dortu | 327/156 |
| 6,181,191 B1 | * 1/2001 | Paschal | 327/513 |

* cited by examiner

Primary Examiner—Tuan T. Lam
Assistant Examiner—Hiep Nguyen
(74) Attorney, Agent, or Firm—Stanton Braden

(57) ABSTRACT

A power controlled input receiver, in accordance with the present invention, includes a receiver circuit including a first current source and a second current source. The first current source supplies current in a power down mode of the receiver and the second current source is enabled for supplying current in a normal operation mode. A signal state detection circuit is coupled to the receiver circuit for detecting an active input signal, and a control signal generator is coupled to the signal state detection circuit for generating an enable signal to enable the second current source when the active input signal is detected.

8 Claims, 4 Drawing Sheets

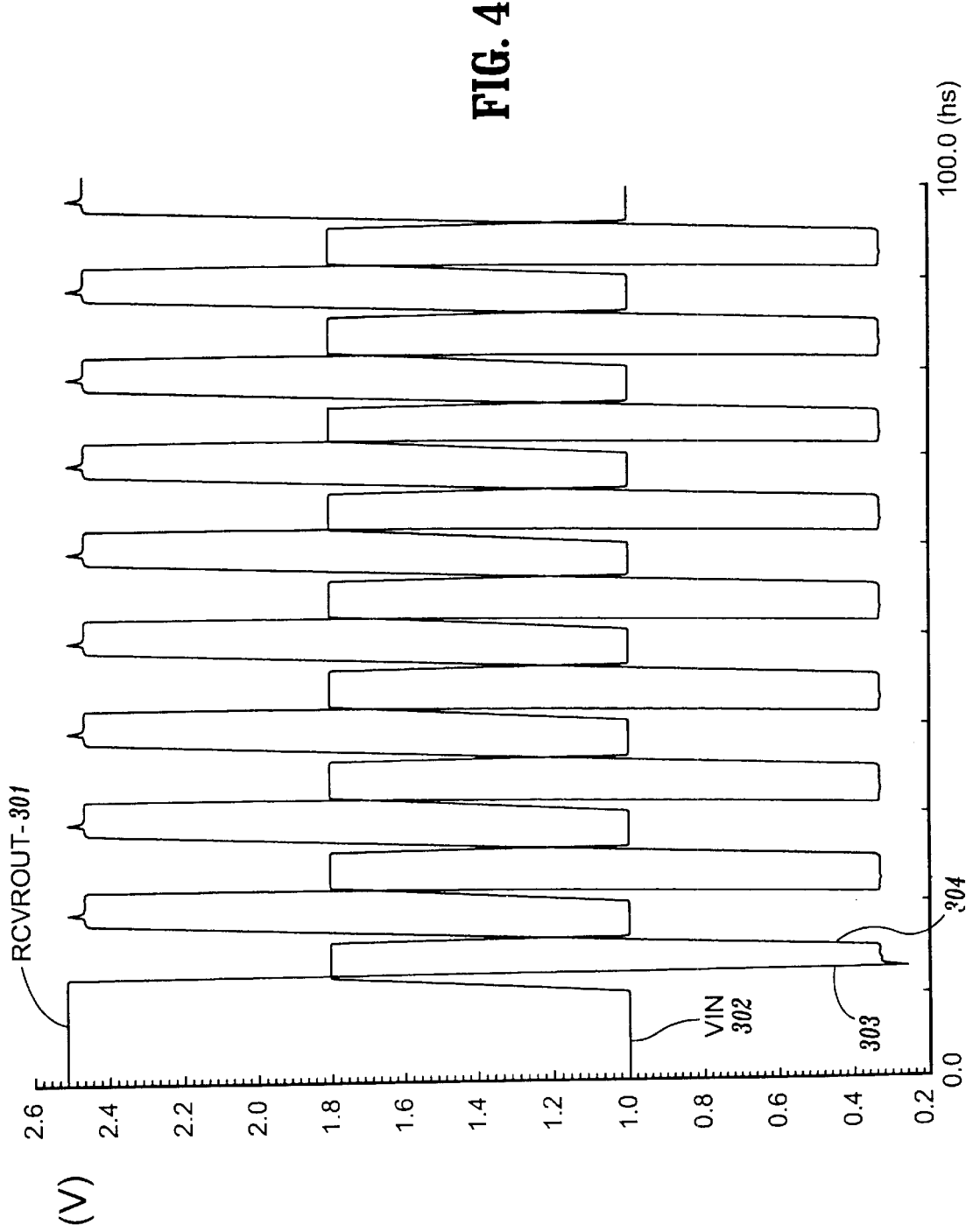

US 6,462,613 B1

POWER CONTROLLED INPUT RECEIVER

BACKGROUND

1. Technical Field

This disclosure relates to receiver circuits and more particularly, to receiver circuits with a low power mode to reduce power consumption.

2. Description of the Related Art

It is desirable in circuit design to reduce the amount of consumed energy. This is important not only from an energy conservation standpoint, but also to reduce heat effects or limit current density, which may be the cause of degradation in the circuitry, for example, electromigration, or stress failures may be more likely. Many circuits, including integrated circuits have limited energy resources available. For example, devices for mobile communications, other portable devices, such as camcorders, or battery powered devices preferably employ circuitry, which reduces power consumption to reduce the amount of energy consumed by the device.

In one example, receiver circuits, such as differential type receivers, exhibit an amount of significant static power consumption when they are enabled. These devices typically remain active at all times, even if an input signal (for example a data strobe or a clock signal) is not active. This represents an undesirable situation since power may be expended unnecessarily.

Therefore, a need exists for receiver circuits with a power down capability when the input signal is inactive.

SUMMARY OF THE INVENTION

A power controlled input receiver, in accordance with the present invention, includes a receiver circuit including a first current source and a second current source. The first current source supplies current in a power down mode of the receiver and the second current source is additionally enabled for supplying current in a normal operation mode. A signal state detection circuit is coupled to the receiver circuit for detecting an active input signal, and a control signal generator is coupled to the signal state detection circuit for generating an enable signal to enable the second current source when the active input signal is detected.

Another power controlled input receiver, in accordance with the present invention, includes a receiver circuit including a first current source and a second current source. The first current source supplies current in a power down mode of the receiver and the second current source is enabled for supplying current in a normal operation mode. A signal state detection circuit is coupled to the receiver circuit. The signal state detection circuit includes an inverter coupled to an output node of the receiver circuit and a current mirror coupled to the inverter and an input state node. The inverter and the current mirror generate pulses on an input state node indicating when the input of the receiver circuit is active. A control signal generator is coupled to the input state node for generating an enable signal in accordance with the pulses to enable the second current source when the input is active.

Yet, another power controlled input receiver of the present invention, includes a receiver circuit including a first current source and a second current source, where the first current source supplies current in a power down mode of the receiver and the second current source is enabled for supplying current in a normal operation mode. A signal state detection circuit is coupled to the receiver circuit, and the signal state detection circuit includes an inverter chain having a first end coupled an output node of the receiver circuit and a second end coupled to a first input of a logic gate. The logic gate has a second input coupled to the output node of the receiver circuit. The logic gate has an output coupled to an input state node. The logic gate generates pulses on an input state node indicating when the input of the receiver circuit is active. A control signal generator is coupled to the input state node for generating an enable signal in accordance with the output of the logic gate to enable the second current source when the input is active.

In alternate embodiments, the receiver circuit may include a differential amplifier. The first current source may include a field effect transistor. The second current source may include a field effect transistor between about 2 and about 10 times larger than the field effect transistor of the first current source. The receiver circuit may include a clock receiver and the input receives clock signals. The first current source of the receiver is active during the power down mode and the normal operation mode. The chain of inverters may include an even number of inverters. The logic may include exclusive OR logic.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein:

FIG. 4 depicts a voltage versus time plot for VIN and RCVROUT signals to demonstrate the advantages of the present invention.

DETAILED DESCRIPTION OF PREFERRED EMBODIMENTS

The present invention provides receiver circuits, which are capable of switching to a low power mode if an input signal thereto is not active. The receiver circuits are switched back to the normal operating mode at a first edge of the input signal. Advantageously, the operating mode of the receiver is controlled by the input signal itself. Consequently, power consumption is reduced when the input signal is not active. The invention is particularly useful in cases where the receiver needs to be active when the input signal is only active during certain periods of time. In the low power mode or power down mode, the receiver draws very little current and exhibits a slower switching behavior.

Figure 1:
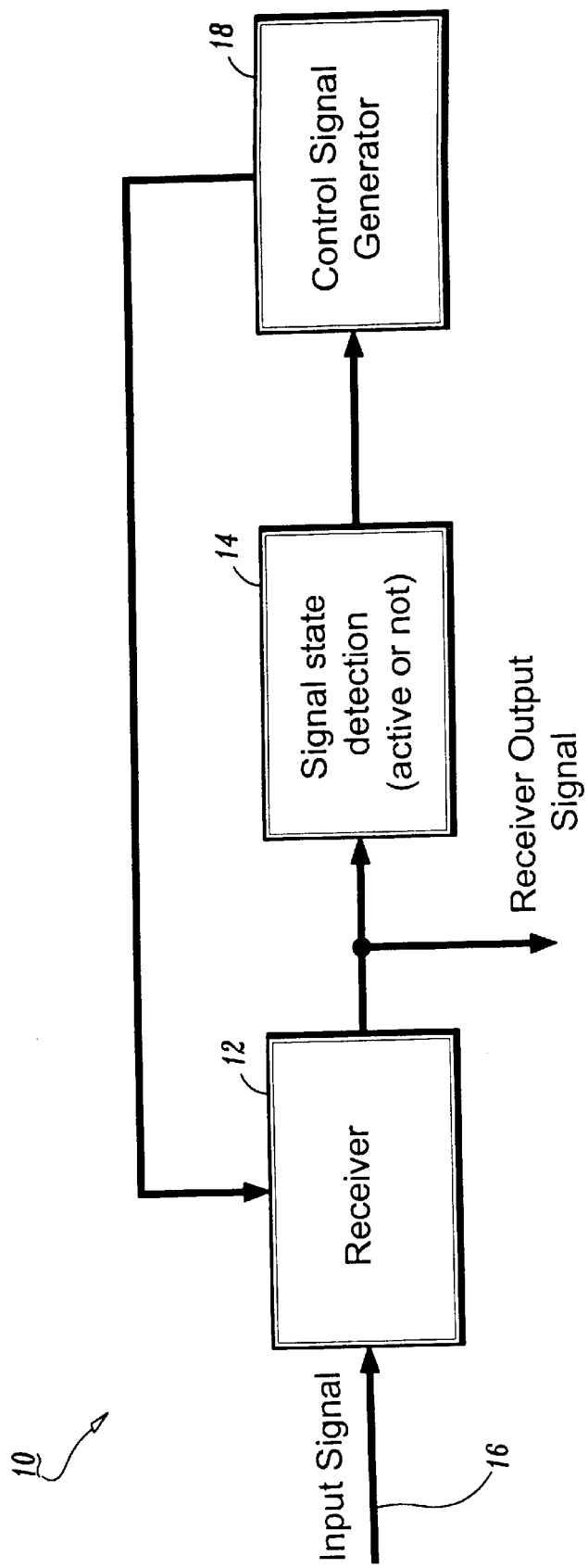
FIG. 1 is a schematic diagram of a power-controlled receiver in accordance with the present invention.

Referring now in specific detail to the drawings in which like reference numerals identify similar or identical elements throughout the several views, and initially to FIG. 1, a schematic block diagram of a power controlled receiver 10 in accordance with the present invention is shown. The controlled receiver 10 includes a receiver circuit 12, a signal state detection circuit 14 which detects whether an input signal 16 is active or not, and a control signal generator 18 which generates a signal to control the power consumption and the speed of the receiver 12. The receiver 12 may include, for example, a clock receiver, which may be employed in integrated circuit devices, such as, semiconductor memories. In particularly useful embodiments, receiver 10 may be employed in dynamic random access memories (DRAMs), embedded DRAMs, application specific integrated circuits (ASICs) or any other device or circuit. In preferred embodiments of the present invention, these chips or circuits may be employed in telecommunications devices, such as telephones, personal digital assistants, or other portable or battery powered devices. In a preferred embodiment, receiver is employed to receive a clock signal or a strobe as input. The receiver 12 may be split into a plurality of receivers, for example, two receivers: one for a low power mode (always on) and one for a normal operating mode (only on if input signal 16 is active).

Figure 2:
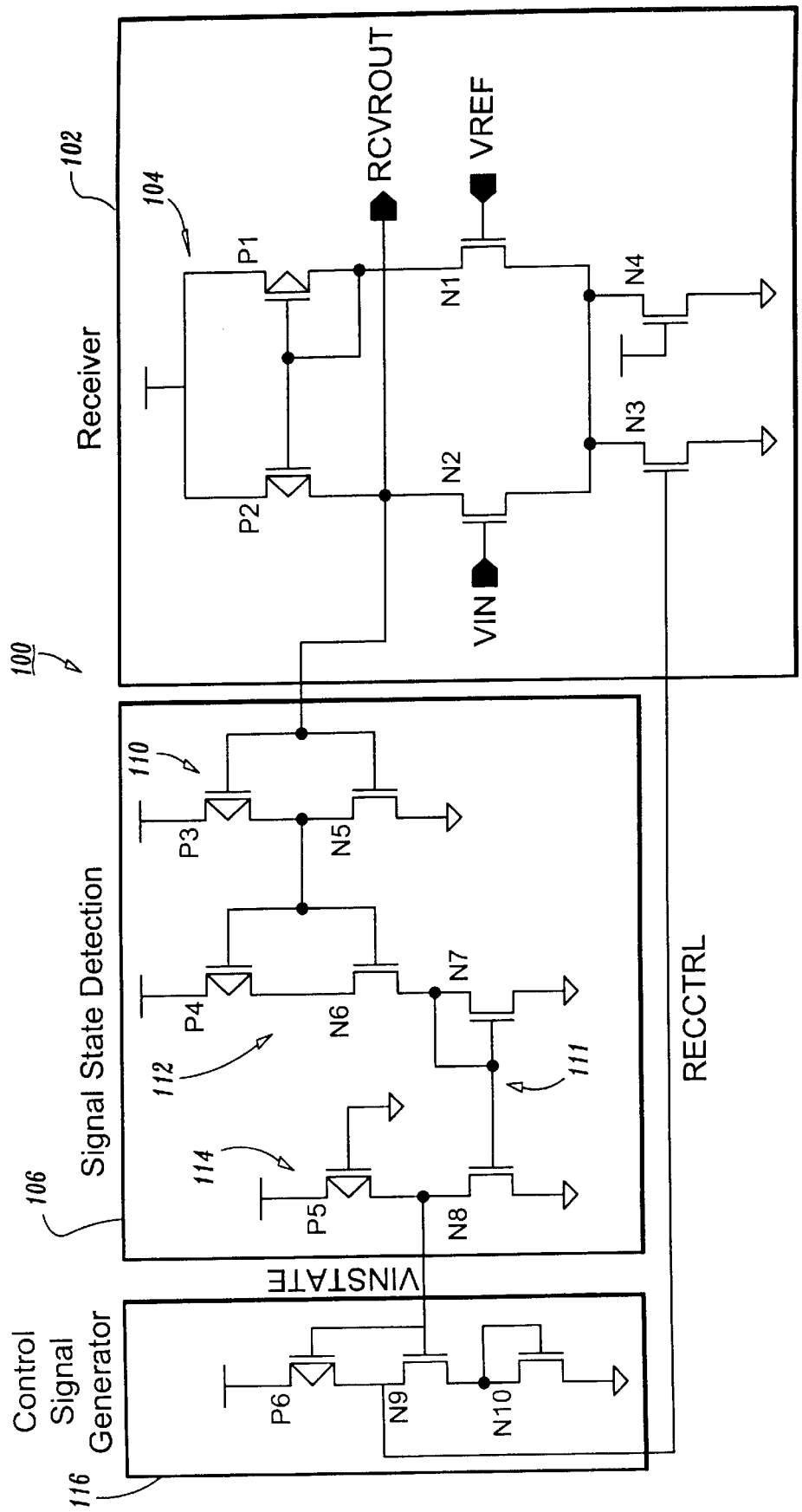
FIG. 2 is a schematic diagram of another embodiment of a power-controlled receiver employing a current mirror in a signal state detection circuit in accordance with the present invention.

Referring to FIG. 2, a schematic diagram of one embodiment of a power-controlled receiver 100 is shown in accordance with the present invention. Controlled receiver 100 includes a receiver circuit 102. In a preferred embodiment, receiver circuit 102 includes a differential amplifier 104, as shown, although other amplifier types may be employed as well. Receiver 102 includes transistors N1, N2, N3, N4, P1, and P2. Transistors P1 and P2 provide a current mirror of receiver 102 and are responsible along with transistors N3 and N4 for determining the response of the amplifier, e.g., hysteresis, and output voltage and/or current at RCVROUT. Transistor N1 receives a reference voltage VREF at its gate, while transistor N2 receives an input signal VIN to enable conduction through differential amplifier 104 to provide output on RCVROUT.

N4 represents a current source in low power mode and is dimensioned to be relatively weak with respect to N3 of receiver 102. In one embodiment, N4 may include a channel width of between $\frac{1}{16}$ to $\frac{1}{2}$ of N3. N4 is active whether input VIN is active or not. Current through N3 (when enabled) may be between about 2 and about 10 times larger than current through N4.

In normal operation mode, N3 is turned on in addition to N4. N3 supplies the current needed for fast operation. In one embodiment, N3 supplies a current of between about 100 to about 500 microamps, while N4 supplies between 10 and 200 microamps. A signal state detection circuit 106 includes transistors N5, N6, N7, N8, P3, P4, and P5. Transistor pair P3 and N5 forms an inverter 110. Inverter 110, including P3 and N5, is used to generate a full swing CMOS (complementary metal oxide semiconductor) signal of RCVROUT. Every time the input signal VIN switches, RCVROUT and the inverter 110 switch too. During every transition, a current pulse is generated through a branch 112 composed of transistors N6, N7, and P4. A current mirror 111 including transistors N7 and N8, mirrors the current pulse in a branch 114 composed of transistors N8 and P5.

Node VINSTATE is pulled down by the current pulses in branch 114. If VIN is switching, transistor P6 is activated. Consequently, node/signal RECCTRL, which is the output of a control signal generator 116, is pulled up to VDD (supply voltage) thereby turning transistor N3 on. When N3 is switched on receiver 102 is in the normal operation mode. The receiver 102 remains in the normal operation mode as long as the input signal VIN is active. If it stops switching, VINSTATE is eventually pulled up by transistor P5. In this case, RECCTRL is pulled down by transistor N9 and N10 thereby disabling the major current drive transistor of the differential receiver N3 which switches the receiver 102 to low power mode. By employing the present invention, power consumption may be reduced by about 50% to 90% if VIN is inactive.

Figure 3:
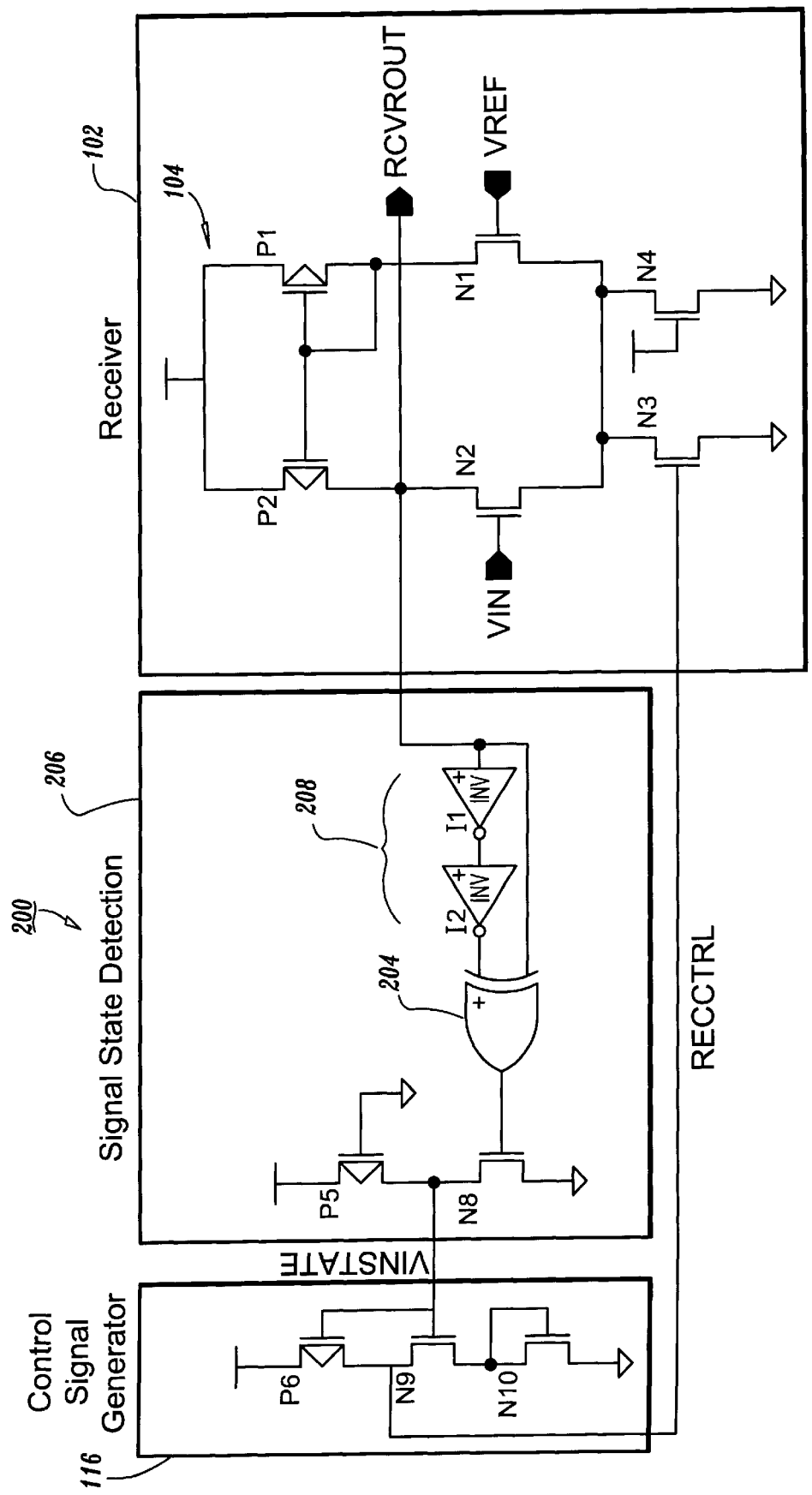
FIG. 3 is a schematic diagram of yet another embodiment of a power-controlled receiver employing a logic gate in a signal state detection circuit in accordance with the present invention.

Referring to FIG. 3, an alternate embodiment of a power controlled receiver, in accordance with the present invention, is shown. A power-controlled receiver 200 includes an exclusive OR gate (EXOR) 204 in a signal state detection circuit 206. In comparison with FIG. 2, a logic gate, such as an EXOR gate 204 and a chain of inverters I1 and I2 are employed to generate the voltage pulses which pull down node VINSTATE if the input signal VIN is active. On every transition of VIN, and therefore RCVROUT, inputs of the EXOR 204 will be dissimilar for a time equal to a propagation delay of an inverter chain 208 (e.g., I1 and I2) which results in corresponding voltage pulses at the output of EXOR 204. The inverter chain 208 may include a plurality of inverters to adjust the propagation delay as needed. Preferably, an even number of inverters in the inverter chain 208 to maintain the polarity of the signals passing through the inverter chain 208.

Referring to FIG. 4, simulated signals for VIN and RCVROUT for a power-controlled receiver in accordance with the present invention are illustratively shown. FIG. 4 shows a trace 301 for RCVROUT and a trace 302 for VIN operating at a frequency of 100 MHz. As can be seen, only a first edge 303 of the output signal RCVROUT includes a slight delay since the receiver is in low power mode when the first edge is received.

By a second edge 304, the receiver has already switched to normal operating mode and this edge 304 is received with the normal delay. In this example, the present invention, advantageously, reduces the power consumption in low power mode approximately an order of magnitude less than in normal mode.

It is to be understood that the embodiments shown in the FIGS. and described herein above are illustrative of the present invention and should not be construed as limiting. Additional components, and circuitry may be added, and device polarities may be changed within the scope of the invention. Although transistors designated with N's and P's are shown as field effect transistors in the FIGS. and described throughout this disclosure, other types of transistors may be employed as well.

Having described preferred embodiments for power controlled input receiver (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A power controlled input receiver comprising:
   a receiver circuit including a first current source and a second current source, the first current source supplying current in a low power mode of the receiver and the second current source being enabled for supplying current in a normal operation mode;
   a signal state detection circuit coupled to the receiver circuit, the signal state detection circuit including an inverter chain having a first end coupled an output node of the receiver circuit and a second end coupled to a first input of a logic gate, the logic gate having a second input coupled to the output node of the receiver circuit, the logic gate having an output coupled to the input state node, the logic gate for generating pulses on an input state node indicating when the input of the receiver circuit is active; and a control signal generator coupled to the input state node for generating an enable signal in accordance with the output of the logic gate to enable the second current source when the input of the receiver circuit is active;

wherein the logic gate includes exclusive OR logic.

2. The receiver as recited in claim 1, wherein the receiver circuit includes a differential amplifier.

3. The receiver as recited in claim 1, wherein the first current source includes a field effect transistor.

4. The receiver as recited in claim 3, wherein the second current source includes a field effect transistor between about 2 and about 10 times larger than the field effect transistor of the first current source.

5. The receiver as recited in claim 1, wherein the receiver circuit includes a clock receiver and the input receives clock signals.

6. The receiver as recited in claim 1, wherein the chain of inverters includes an even number of inverters.

7. The receiver as recited in claim 1, wherein the first current source of the receiver is active during the low power mode and the normal operation mode.

8. The receiver as recited in claim 1, wherein the second current source of the receiver is active during the normal operation mode.

* * * * *